United States Patent Office 3,150,954
Patented Sept. 29, 1964

3,150,954
HERBICIDAL COMPOSITION AND METHOD OF CONTROLLING GRASSES AND BROADLEAVED WEEDS THEREWITH
Albert Frederick James Wheeler, Bracknell, England, assignor to Imperial Chemical Industries Limited, London, England, a corporation of Great Britain
No Drawing. Filed Dec. 5, 1960, Ser. No. 73,552
Claims priority, application Great Britain Dec. 11, 1959
10 Claims. (Cl. 71—2.5)

This invention relates to compositions of matter comprising mixtures of a residual herbicide and a 4:4′ dipyridylium quaternary salt and to herbicidal compositions containing these mixtures.

The term "residual herbicide" used in this specification means a herbicide which when applied to soil has a persistent herbicidal effect and enters plants with which it comes into contact principally through the roots. Residual herbicides are primarily effective against germinating seeds, though at high dosage rates they will also kill established vegetation.

Residual herbicides have been widely used for killing grasses and broad-leafed weeds, but most in common use suffer from the disadvantage that a considerable time elapses before they show their full effect. During this time the weeds are in general apparently little affected and continue to be objectionable. It has now been found according to this invention that this disadvantage can largely be overcome by using a residual herbicide in admixture with a 4:4′ dipyridylium quaternary salt. A number of 4:4′ dipyridylium quaternary salts have previously been described as having herbicidal activity, but hitherto their value as herbicides has been thought to lie principally in the speed with which they damage the top growth of unwanted vegetation. It has now been found that mixtures of this invention not only provide a rapid kill of weeds, but that in some instances the herbicidal effect obtained using these mixtures is greater than that which would have been expected from an additive herbicidal effect of the constituent herbicides. An additive effect is itself most desirable and cannot be predicted in view of the fact that a number of herbicides known to the art do not show an additive effect when used together.

The present invention, therefore, provides compositions of matter having herbicidal properties and comprising mixtures of a residual herbicide and a 4:4′ dipyridylium quaternary salt.

The dipyridylium quaternary salt used in the compositions of the invention can be a compound of the general formula:

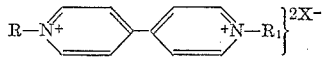

where R and $R_1$, which can be the same or different, are each a lower alkyl radical and $X^-$ is an anion. The alkyl radicals R and $R_1$ are preferably ones having 1–4 carbon atoms.

The dipyridylium salt can optionally be one having one or more substituents in either of the pyridine rings or in one or both of the alkyl radicals. Where one or both of the alkyl radicals has a substituent it can be, for example, a halogen atom, for instance chlorine, or a hydroxyl, carboxyl, alkoxy, carboalkoxy, carbamyl, N-substituted carbamyl or di- or tri-substituted amino groups. The anion can be any one of a large number of anions, for example chloride, bromide, iodide or methosulphate. Examples of 4:4′ dipyridylium salts which can be used are the compounds disclosed in United Kingdom specifications Nos. 813,531 and 813,532.

Two 4:4′-dipyridylium salts which have been found to be of particular value in compositions according to the present invention are 4:4′-dipyridylium dimethosulphate and 4:4′-dipyridylium di-β-hydroxyethyl dichloride.

The residual herbicide of the compositions of the invention can be a substituted urea herbicide, for example a compound of the general formula:

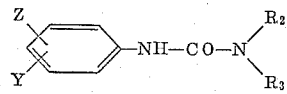

where $R_2$ and $R_3$, which can be the same or different, are lower alkyl radicals, Y is a halogen atom and Z is a hydrogen or a halogen atom. The alkyl radicals $R_2$ and $R_3$ are preferably ones having 1–4 carbon atoms and the halogen atoms are conveniently chlorine atoms. Examples of suitable residual herbicides within the class of substituted ureas are N-(4-chloro-phenyl-N′:N′-dimethylurea and N-(3:4-dichlorophenyl)-N′:N′-dimethylurea, also known respectively by their common names monuron and diuron.

Other residual herbicides which can be used are s-triazine compounds, for example those of the general formula:

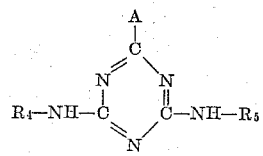

where $R_4$ and $R_5$, which can be the same or different, are each a lower alkyl radical (for example one having 1–4 carbon atoms) and A is a halogen, for example chlorine. A suitable residual herbicide of this class is 2-chloro-4:6-bisethylamino-s-triazine, also known by the common name simazine.

Mixtures according to this invention which are of particular interest are 4:4′-dipyridylium dimethosulphate or 4:4′-dipyridylium di-β-hydroxyethyl dichloride with monuron, diuron or simazine.

The invention also includes herbicidal compositions comprising as active ingredients a 4:4′ dipyridylium quaternary salt and a residual herbicide in admixture with a suitable diluent or carrier. The herbicidal compositions can, for example, be liquid compositions obtained by dissolving or dispersing the active ingredients in a suitable liquid, for example water or an organic solvent. In general it is convenient to use water as the liquid. The liquid compositions can contain if desired, a suitable wetting or dispersing agent, or other suitable auxiliary agents known in the art as being useful in liquid formulations. A suitable wetting agent is a condensation product of ethylene oxide with an alkyl phenol, for example the product obtained by condensing octylcresol with 7–8 molecular proportions of ethylene oxide. Very satisfactory liquid compositions are those containing a total of from 0.1% to 5% and especially from 0.5% to 1.0% by weight of the active ingredients.

The residual herbicide and the 4:4′ dipyridylium quaternary salt are preferably present, whether in the compositions of matter of the invention or in the liquid or solid herbicidal compositions of the invention for use as a total herbicide, in a raito by weight of from 30:1 to 1:1, preferably from 10:1 to 1:1 and especially from 5:1 to 2.5:1.

The invention also consists in a method of killing or severely damaging grasses or broad-leaved weeds, in which the grasses or weeds are treated with a composition of matter or with a herbicidal composition of this invention.

The invention is illustrated by the following examples.

EXAMPLE 1

This example illustrates the herbicidal effect of mixtures of 4:4'-dipyridylium dimethosulphate (referred to below in this example as the "dipyridylium salt") with the residual herbicides monuron, diuron, and simazine respectively; and compares this with the effect obtained using the herbicides independently.

Each of the herbicidal compositions was applied as an aqueous composition to each of four replicate plots covered with mixed broad leafed weeds and grasses by spraying the composition at the rate of 160 gallons/acre.

The aqueous compositions used contained respectively the following amounts of herbicide in 160 gallons of water.

(1) 2 lb. dipyridylium salt
(2) 8 lb. monuron
(3) 8 lb. diuron
(4) 5 lb. simazine
(5) 2 lb. dipyridylium salt+8 lb. monuron
(6) 2 lb. dipyridylium salt+8 lb. diuron
(7) 2 lb. dipyridylium salt+5 lb. simazine The monuron, diuron and simazine used in this example were in the form of commercial products respectively sold under the trade names Telvar (containing 80% monuron) Karmex (containing 80% diuron) and Weedex (containing 50% simazine).

The herbicidal effect of the individual herbicides and of the mixtures of herbicides was observed 16 days, two months and four months after spraying and the results obtained are set out in the following Tables 1, 2 and 3. In assessing the amount of weed control obtained, each of the treated plots was examined and a visual estimate made of the percentage of vegetation remaining, equal regard being given to the area and vigour of the vegetation, compared with that of comparable plots to which no herbicide had been applied. These observations were made by two observers, and each of the plots in the experiment were similarly assessed. The figures given in the tables are the mean values of all the observations made in respect of plots treated with the same herbicidal composition.

In Tables 1, 2 and 3 the figures in the column headed "Weed control" represent the percentage of the vegetation which had died following the application of herbicide compared with the vegetation of a control plot to which no herbicide had been applied. The figures in the column headed "Theoretical weed control" represent the total weed control which would have been expected using the mixtures of the herbicides based on the results obtained using the herbicides alone and assuming that the effect of using the mixtures of herbicides is additive. The theoretical weed control figures have been obtained by applying the weed control value for one herbicide of a mixture to the percentage of vegetation unaffected by the second component of the mixture when used alone. For example, in Table 2 the weed control shown by the dipyridylium salt is 23%, the percentage of the vegetation not killed by that herbicide being 77%. The percentage weed control shown by monuron was 46% and therefore (assuming an additive effect) it might have been expected that when used in conjunction with dipyridylium salt, the monuron would kill 46% of the 77% vegetation unaffected by the dipyridylium salt, that is 35%. Thus the percentage of vegetation which might be expected to be killed by the mixture of the dipyridylium salt and monuron (the theoretical weed control) would be 35%+23%=58%. In fact the percentage of vegetation killed by the mixture was 75%.

It will be seen from Tables 1–3 that the weed control obtained in practice using the mixtures of herbicides was in effect substantially greater than the theoretical weed control, indicating that the herbicidal effect obtained was more than an additive effect.

Table 1
16 DAYS AFTER APPLICATION

| Herbicidal Composition | Weeds remaining (percent) | Weed control (percent) | Theoretical weed control (percent) |
|---|---|---|---|
| Dipyridylium salt | 72 | 28 | |
| Monuron | 76 | 24 | |
| Diuron | 90 | 10 | |
| Simazine | 86 | 14 | |
| Dipyridylium salt and monuron | 53 | 47 | 46 |
| Dipyridylium salt and diuron | 55 | 45 | 35 |
| Dipyridylium salt and simazine | 51 | 49 | 38 |

Table 2
2 MONTHS AFTER APPLICATION

| Herbicidal Composition | Weeds remaining (percent) | Weed control (percent) | Theoretical weed control (percent) |
|---|---|---|---|
| Dipyridylium salt | 77 | 23 | |
| Monuron | 54 | 46 | |
| Diuron | 61 | 39 | |
| Simazine | 62 | 38 | |
| Dipyridylium salt and monuron | 25 | 75 | 58 |
| Dipyridylium salt and diuron | 31 | 69 | 53 |
| Dipyridylium salt and simazine | 36 | 64 | 52 |

Table 3
4 MONTHS AFTER APPLICATION

| Herbicidal Composition | Weeds remaining (percent) | Weed control (percent) | Theoretical weed control (percent) |
|---|---|---|---|
| Dipyridylium salt | 81 | 19 | |
| Monuron | 47 | 53 | |
| Diuron | 44 | 56 | |
| Simazine | 44 | 56 | |
| Dipyridylium salt and monuron | 29 | 71 | 62 |
| Dipyridylium salt and diuron | 31 | 69 | 64 |
| Dipyridylium salt and simazine | 33 | 67 | 64 |

EXAMPLE 2

This example illustrates the herbicidal effect of mixtures of 4:4'-dipyridylium di-β-hydroxyethyl dichloride (referred to below in this example as the "diquaternary salt") with diuron and simazine and compares this effect with the effect obtained using the herbicides independently.

Each of the herbicidal compositions tested was applied as an aqueous composition to each of four replicate plots covered with mixed broad leafed weeds and grasses by spraying the composition at the rate of 100 gallons/acre. The diuron and simazine used in this example were the commercial products respectively sold under the trade names Karmex and Weedex referred to in Example 1 above.

The five herbicidal compositions tested have been designated respectively A, B, C, D and E and their composition was as follows:

Herbicidal Composition:     Herbicide
A _____ Diquaternary salt (2 lb./acre).
B _____ Karmex (10 lb./acre).
C _____ Weedex (16 lb./acre).
D _____ Mixture of diquaternary salt (2 lb./acre) and Karmex (10 lb./acre).
E _____ Mixture of diquaternary salt (2 lb./acre) and Weedex (10 lb./acre).

The herbicidal effect of the five herbicidal compositions was observed 5, 11 and 17 weeks after application and the results obtained (which were assessed by the method described above in Example 1) are set out below in Tables 4, 5 and 6.

It will be seen from Tables 4, 5 and 6 that the weed control obtained using the mixtures of herbicides was greater than the theoretical weed control and that the difference increased with increase of time after treatment.

*Table 4*

5 WEEKS AFTER APPLICATION

| Herbicidal Composition | Weeds remaining (percent) | Weed control (percent) | Theoretical weed control (percent) |
|---|---|---|---|
| A | 17 | 83 | |
| B | 43 | 57 | |
| C | 29 | 71 | |
| D | 7 | 93 | 93 |
| E | 11 | 89 | 95 |

*Table 5*

11 WEEKS AFTER APPLICATION

| Herbicidal Composition | Weeds remaining (percent) | Weed control (percent) | Theoretical weed control (percent) |
|---|---|---|---|
| A | 65 | 35 | |
| B | 58 | 42 | |
| C | 20 | 80 | |
| D | 27 | 73 | 62 |
| E | 10 | 90 | 87 |

*Table 6*

17 WEEKS AFTER APPLICATION

| Herbicidal Composition | Weeds remaining (percent) | Weed control (percent) | Theoretical weed control (percent) |
|---|---|---|---|
| A | 97 | 3 | |
| B | 75 | 25 | |
| C | 25 | 75 | |
| D | 61 | 39 | 27 |
| E | 20 | 80 | 76 |

EXAMPLE 3

This example describes tests carried out in a glasshouse using fixtures of 4:4'-dipyridylium dimethosulphate (referred to below as the "dipyridylium salt") and diuron. The diuron used was in the form of the commercial product Karmex referred to above.

The 4:4'-dipyridylium dimethosulphate and diuron were tested as aqueous compositions separately and in admixture with each other at various rates of application. The various aqueous compositions (which each contained 0.1% by weight of wetting agent) were tested by being sprayed at a rate equivalent to 20 gallons/acre on to boxes containing mixtures of the following representative species of broadleaved and gramineous plants: wheat, wild oats, kale, mustard, sugar-beet, red-clover and cleavers.

The wetting agent used was a 30% by weight aqueous solution of the product obtained by condensing 1 mole of p-octyl cresol with 9–10 moles of ethylene oxide.

The six herbicidal compositions tested containing single herbicides have been designated A, B, C, D, E and F, respectively and their composition was as follows:

Herbicidal Composition: Herbicide
- A — Dipyridylium salt (1/8 lb./acre).
- B — Dipyridylium salt (1/16 lb./acre).
- C — Dipyridylium salt (1/32 lb./acre).
- D — Diuron (1/2 lb./acre).
- E — Diuron (1/4 lb./acre).
- F — Diuron (1/8 lb./acre).

The compositions containing mixtures of the dipyridylium salt and diuron are designated in Tables 7 and 8 below by the combination of letters corresponding to the concentrations of the individual herbicides. For example, A+D indicates the composition containing the dipyridylium salt and diuron in the concentrations corresponding to rates of 1/8 and 1/2 lb./acre respectively.

From the results obtained it will be seen that, as in the field trials, the mixtures of herbicides show more than an additive effect.

*Table 7*

ONE WEEK AFTER APPLICATION

| Herbicidal Composition | Weeds remaining (percent) | Weed control (percent) | Theoretical weed control (percent) |
|---|---|---|---|
| A | 76 | 24 | |
| B | 74 | 26 | |
| C | 94 | 6 | |
| D | 86 | 14 | |
| E | 87 | 13 | |
| F | 86 | 14 | |
| A+D | 43 | 57 | 35 |
| A+E | 40 | 60 | 34 |
| A+F | 63 | 37 | 41 |
| B+D | 60 | 40 | 36 |
| B+E | 59 | 41 | 36 |
| C+D | 63 | 37 | 21 |
| C+F | 73 | 27 | 19 |

*Table 8*

5 WEEKS AFTER APPLICATION

| Herbicidal Composition | Weeds remaining (percent) | Weed control (percent) | Theoretical weed control (percent) |
|---|---|---|---|
| A | 63 | 37 | |
| B | 63 | 37 | |
| C | 93 | 7 | |
| D | 24 | 76 | |
| E | 46 | 54 | |
| F | 47 | 53 | |
| A+D | 17 | 83 | 85 |
| A+E | 11 | 89 | 71 |
| A+F | 9 | 91 | 77 |
| B+D | 4 | 96 | 85 |
| B+E | 13 | 87 | 71 |
| C+D | 10 | 90 | 88 |
| C+F | 23 | 77 | 56 |

Results obtained from the glasshouse tests show very clearly that the herbicidal effect obtained using diuron alone at the rate equivalent to 1/2 lb./acre is much less than that of a mixture of diuron applied at a rate equivalent to 1/4 lb./acre and the dipyridylium salt at a rate equivalent to 1/16 lb./acre despite the fact that the total herbicide content of the mixture is over 18% less. Similarly, diuron alone at the rate of 1/2 lb./acre is much less effective than a mixture of diuron and the dipyridylium salt applied at the rate of only 1/8 lb./acre each. These comparative results are set out in Tables 9 and 10 below.

*Table 9*

| Days after spraying | Weed Control (percent) | |
|---|---|---|
| | Diuron, 1/2 lb./acre | Diuron (1/4 lb./acre) + dipyridylium salt (1/16 lb./acre). |
| 7 | 14 | 41 |
| 11 | 47 | 76 |
| 18 | 67 | 86 |
| 25 | 73 | 90 |
| 32 | 76 | 87 |

Table 10

| Days after spraying | Weed Control (percent) | |
|---|---|---|
| | Diuron, ½ lb./acre | Diuron (¼ lb./acre)+ dipyridylium salt (⅛ lb./acre) |
| 6 | 16 | 37 |
| 10 | 53 | 76 |
| 17 | 79 | 87 |
| 24 | 80 | 90 |
| 35 | 87 | 91 |

EXAMPLE 4

The tests of Example 3 were repeated, but using simazine instead of diuron. The simazine used was in the form of the commercial product Weedex referred to above.

The four herbicidal compositions tested containing single herbicides have been designated A, B, C and D respectively and their composition was as follows:

Herbicidal
composition:                Herbicide
A _____ Dipyridylium salt (⅛ lb./acre).
B _____ Dipyridylium salt (1/16 lb./acre).
C _____ Simazine (½ lb./acre).
D _____ Simazine (¼ lb./acre).

The compositions containing mixtures of the dipyridylium salt and simazine are designated in Tables 11 and 12 below by the combination of letters corresponding to the concentrations of the individual herbicides. For example, A+C indicates the composition containing the dipyridylium salt and simazine in the concentrations corresponding to rates of ⅛ and ½ lb./acre respectively.

The results obtained show much more than an additive effect between the ingredients of the mixtures.

Table 11
ONE WEEK AFTER APPLICATION

| Herbicidal Composition | Weeds Remaining (percent) | Weed Control (percent) | Theoretical weed control (percent) |
|---|---|---|---|
| A | 70 | 30 | |
| B | 80 | 20 | |
| C | 96 | 4 | |
| D | 93 | 7 | |
| A + C | 53 | 47 | 33 |
| A + D | 46 | 54 | 35 |
| B + C | 76 | 24 | 23 |
| B + D | 66 | 34 | 26 |

Table 12
4 WEEKS AFTER APPLICATION

| Herbicidal Composition | Weeds Remaining (Percent) | Weed Control (Percent) | Theoretical weed control (Percent) |
|---|---|---|---|
| A | 56 | 44 | |
| B | 64 | 36 | |
| C | 53 | 47 | |
| D | 46 | 54 | |
| A+C | 13 | 87 | 70 |
| A+D | 13 | 87 | 74 |
| B+C | 14 | 86 | 66 |
| B+D | 16 | 84 | 71 |

The results obtained from the tests of Example 4 show that the herbicidal effect obtained using simazine at the rate of ½ lb./acre is much less than that using a mixture of simazine and dipyridylium salt respectively at the rates of ¼ lb./acre and 1/16 lb./acre; and the advantage obtained using the mixture is seen in Table 13 below to be obtained in good measure up to a date 28 days from the date of application.

Table 13

| Days after spraying | Weed Control (Percent) | |
|---|---|---|
| | Simazine, ½ lb./acre | Simazine (¼ lb./ac.) +Dipyridylium salt (1/16 lb./acre) |
| 7 | 4 | 34 |
| 14 | 14 | 71 |
| 21 | 31 | 83 |
| 28 | 47 | 84 |

What I claim is:

1. A composition of matter having herbicidal properties and comprising a herbicidally effective amount of a 4:4′-dipyridylium quaternary salt of the formula:

$$\{R-N^+C_5H_4-C_5H_4N^+-R_1\}2X^-$$

wherein R and $R_1$ are each an alkyl radical having 1–4 carbon atoms, and X is an anion; and a residual herbicide selected from the group consisting of substituted ureas of the formula:

$$\underset{Y}{\overset{Z}{\diagup}}C_6H_3-NH-CO-N\underset{R_3}{\overset{R_2}{\diagup}}$$

wherein $R_2$ and $R_3$ are each an alkyl radical having 1–4 carbon atoms; Y is halogen and Z is a member of the group consisting of hydrogen and halogen, and substituted s-triazine compounds of the formula:

$$R_4-NH-C\underset{N}{\overset{N=C(A)-N}{\diagdown\diagup}}C-NH-R_5$$

wherein $R_4$ and $R_5$ are each an alkyl radical having from 1–4 carbon atoms; and A is halogen, said quaternary salt and residual herbicide being present in proportions sufficient to give a greater than additive herbicidal effect.

2. A composition according to claim 1, in which the 4:4′-dipyridylium quaternary salt is 4:4′-dipyridylium dimethochloride.

3. A composition according to claim 1, in which the 4:4′-dipyridylium quaternary salt is 4:4′-dipyridylium di-β-hydroxyethyl dichloride.

4. A composition according to claim 1, in which the striazine compound is 2-chloro-4:6-bisethylamino-s-triazine.

5. A composition according to claim 1, in which the residual herbicide and the 4:4′-dipyridylium quaternary salt are present in a ratio by weight from 30:1 to 1:1.

6. A composition according to claim 5, in which the ratio is from 10:1 to 1:1.

7. A method of controlling grasses and broad-leaved weeds which comprises treating said grasses and weeds with a composition comprising a herbicidally effective amount of a 4:4′-dipyridylium quaternary salt of the formula:

$$\{R-N^+C_5H_4-C_5H_4N^+-R_1\}2X^-$$

wherein R and $R_1$ are each an alkyl radical having 1–4 carbon atoms, and X is an anion; and a residual herbicide selected from the group consisting of substituted ureas of the formula:

$$\underset{Y}{\overset{Z}{\diagup}}C_6H_3-NH-CO-N\underset{R_3}{\overset{R_2}{\diagup}}$$

wherein $R_2$ and $R_3$ are each an alkyl radical having 1–4 carbon atoms; Y is halogen; and Z is a member of the group consisting of hydrogen and halogen, and substituted s-triazine compounds of the formula:

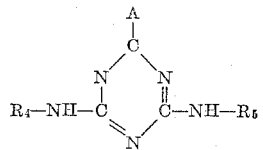

wherein $R_4$ and $R_5$ are each an alkyl radical having from 1–4 carbon atoms; and A is halogen, said quaternary salt and residual herbicide being present in proportions sufficient to give a greater than additive herbicidal effect.

8. A composition of matter comprising a mixture of a herbicidally effective amount of 4:4'-dipyridylium dimethochloride and N-(4-chloro-phenyl)-N':N'-dimethylurea, said ingredients being present in proportions sufficient to give a greater than additive herbicidal effect.

9. A composition of matter comprising a mixture of a herbicidally effective amount of 4:4'-dipyridylium dimethochloride and N-(3:4-dichlorophenyl)-N':N'-dimethylurea, said ingredients being present in proportions sufficient to give a greater than additive herbicidal effect.

10. A composition of matter comprising a mixture of a herbicidally effective amount of 4:4'-dipyridylium dimethochloride and 2-chloro-4:6-bisethylamino-s-triazine, said ingredients being present in proportions sufficient to give a greater than additive herbicidal effect.

References Cited in the file of this patent

UNITED STATES PATENTS

| | | |
|---|---|---|
| 2,709,648 | Ryker et al. | May 31, 1955 |
| 2,847,293 | Harris et al. | Aug. 12, 1958 |
| 2,904,423 | Stone et al. | Sept. 15, 1959 |
| 2,972,528 | Brain et al. | Feb. 21, 1961 |

FOREIGN PATENTS

| | | |
|---|---|---|
| 1,135,848 | France | Dec. 22, 1956 |